United States Patent

[11] 3,623,947

| [72] | Inventors | Robert R. Hobson;<br>Thomas E. Griffin, both of San Jose, Calif. |
|---|---|---|
| [21] | Appl. No. | 467,822 |
| [22] | Filed | June 22, 1965 |
| [45] | Patented | Nov. 30, 1971 |
| [73] | Assignee | The United States of America as represented by the United States Atomic Energy Commission |

[54] NUCLEAR REACTOR AND THERMIONIC CONVERTER CELLS THEREFOR
12 Claims, 9 Drawing Figs.

[52] U.S. Cl. .................................................. 176/39, 310/4
[51] Int. Cl. .................................................. H02n 3/00, G21c 1/00
[50] Field of Search .......................................... 176/39; 310/4

[56] References Cited
UNITED STATES PATENTS

| 3,137,798 | 6/1964 | Noyes et al. ............... | 310/4 |
| 3,137,799 | 6/1964 | O'Connor ................... | 310/4 |
| 3,227,900 | 1/1966 | Sidoti ........................ | 310/4 |

Primary Examiner—Reuben Epstein
Attorney—Roland A. Anderson

ABSTRACT: A nuclear thermionic converter has a vertical stack of annular or ring-shaped nuclear fuel members. Within the ring-shaped members is reflector material. Thermionic diodes are mounted on the periphery of the fuel rings, with the emitters being in contact with the fuel. The collectors are filled with moderating material and the reactor is cooled by heat radiation.

PATENTED NOV 30 1971

INVENTORS.
Robert R. Hobson
BY  Thomas E. Griffin

ATTORNEY.

INVENTORS.
Robert R. Hobson
BY  Thomas E. Griffin

ATTORNEY.

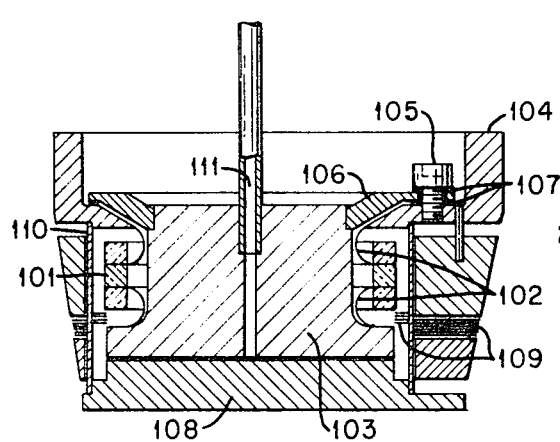
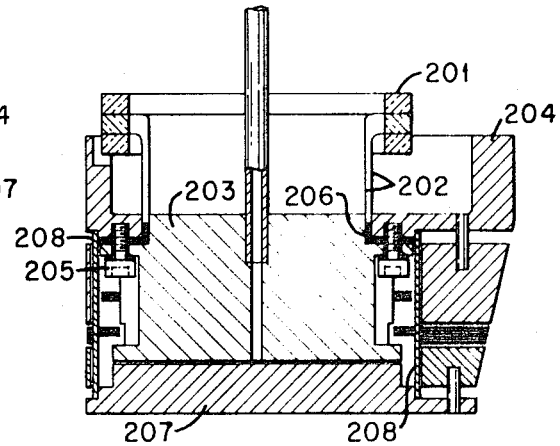
Fig. 7.                Fig. 9.
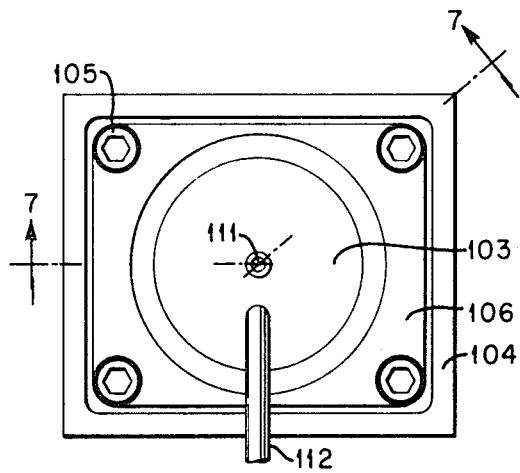
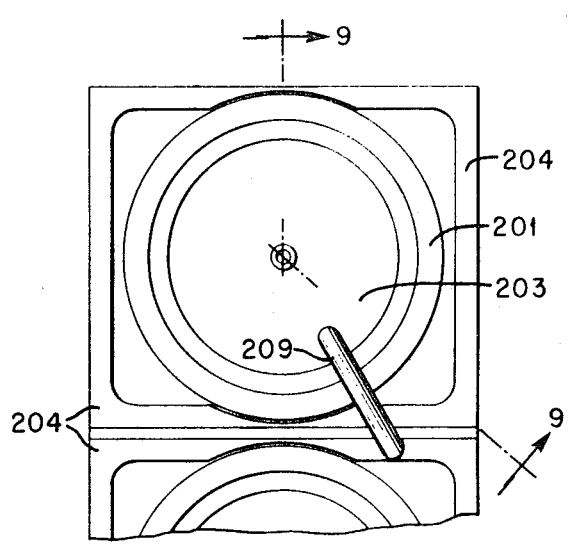
Fig. 6.                Fig. 8.
INVENTORS.
Robert R. Hobson
BY Thomas E. Griffin
ATTORNEY.

NUCLEAR REACTOR AND THERMIONIC CONVERTER CELLS THEREFOR

This invention relates to a nuclear reactor system which is capable of converting heat generated by nuclear fission directly to electrical energy by employing thermionic emission.

When a metallic element called a cathode or emitter is heated, electrons are boiled off or thermionically emitted from the surface of the element. If a cooled metallic element called a collector or anode is placed in close proximity to the emitter, electrons will flow from the emitter to the collector. This combination of two elements, an emitter and a collector, is designated a thermionic diode.

Any number of means may be devised to heat the emitter of the thermionic diode. Where the emitter is integrally connected to fissionable nuclear fuel so that fissions occurring in the fuel heat the emitter, the combination of thermionic diode and fuel is termed nuclear thermionic converter cell. One problem in prior art nuclear thermionic converter cells has been the inhibition of electron current flow by space charge effects. The electrons flowing from emitter to collector build up a negative space charge and, by electric repulsion, discourage further electron flow. Two ways to reduce the space charge are to minimize the distance between collector and emitter or to neutralize the space charge with positive ions and thereby create an electrically neutral plasma of ions and electrons between the emitter and the collector. Prior art devices have experienced difficulty in maintaining the spacing distances and in insuring gastight seals so that the plasma is not lost. Accordingly, it is one object of this invention to provide a novel means of sealing a nuclear thermionic converter cell and maintaining an effective spacing between emitter and collector.

Another object of the subject invention is to provide a nuclear thermionic converter cell in which the major portion of the fission heat is produced in close proximity to the electron emitter.

Another object of the invention is to provide a novel means of mounting and connecting the diodes of nuclear thermionic cells.

A still further object of the subject invention is to provide a nuclear reactor suitable for thermionic conversion.

Other objects and advantages of the invention will appear more clearly from the following description thereof.

The novel nuclear thermionic converter cell of the subject invention combines in one unit the reactor fuel, the thermionic diode, and the radial neutron reflector. This unit has an annular or ring-shaped fuel region of solid refractory material. The fuel in a vertically stacked array of cells forms the core of the reactor which is tubular in shape thus putting heat generation at the periphery of the reactor.

A solid cylinder of reflector material fills the central void of the tubular core. Radial neutron reflection on the core's periphery is provided by the reflecting material which fills the collectors of the thermionic diodes. End reflectors for the top and bottom of the tubular core are also provided. A novel control means that can be applied to the subject reactor is disclosed in our copending application Ser. No. 467,821 filed June 22, 1965, which is incorporated herein by reference.

The thermionic diodes are disposed about the periphery of the converter cells with the emitters of each diode being integrally fastened to the fuel ring in order to provide a short heat transfer path to the emitter. Each diode is individually sealed with its own plasma reservoir. The diodes and cells are designed to minimize the effects of thermal expansion and structural loads on seals and insulation.

These and other advantages of the subject invention may be more clearly recognized by reference to the following drawings and detailed description in which:

FIG. 6 is a top view of an alternate embodiment of the subject invention;

FIG. 7 is a view along line 7—7 of FIG. 6;

FIG. 8 is a top view of a second alternate embodiment of the subject invention; and, FIG. 9 is a view along line 9—9 of FIG. 8.

Figure 2:
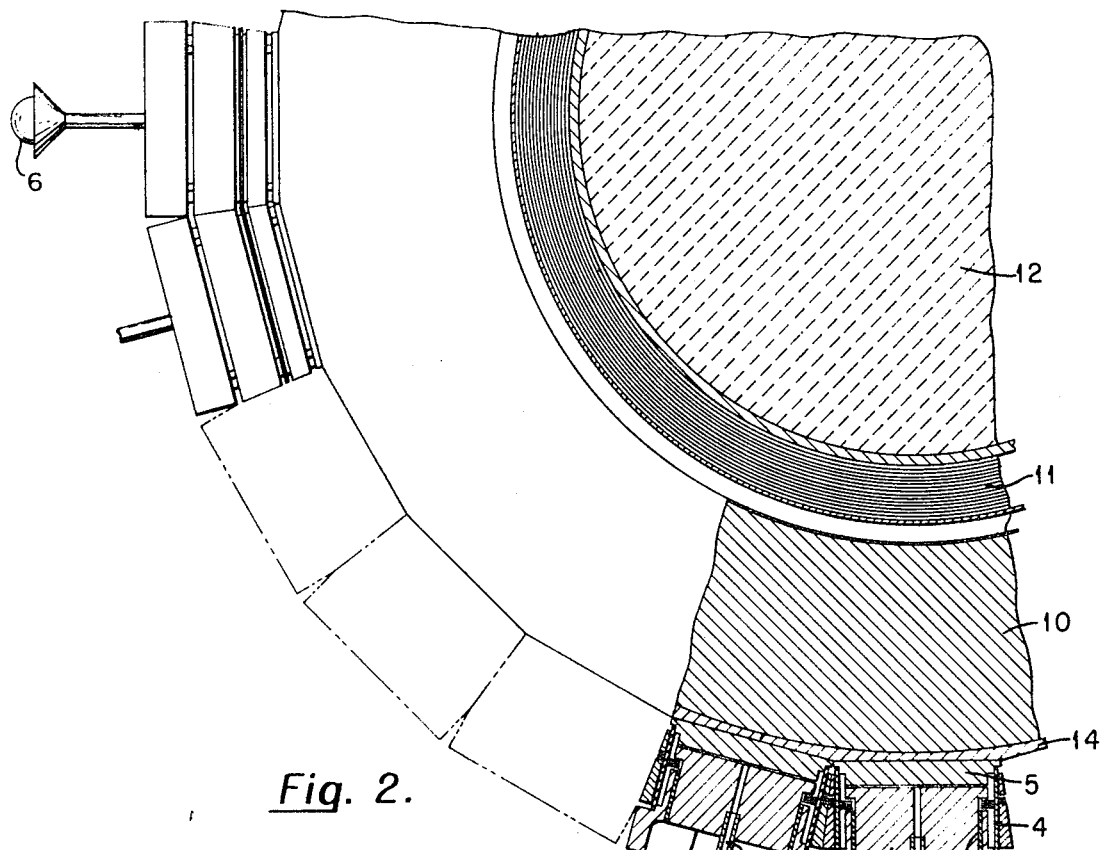
FIG. 2 is a cross-sectional view of one quadrant of the nuclear reactor showing the thermionic diodes mounted on the fuel rings which make up the converter cells and the reactor core.

Referring now to FIG. 2 a cross-sectional view of one quadrant of the subject invention is shown. Island reflector 12 is an elongated cylinder of a neutron moderating and reflecting material which in the preferred embodiment is pyrolytic graphite because of its unique heat-conducting properties, but a material such as beryllium or beryllium oxide could be used. Island reflector 12 is annularly surrounded by foil heat shields 11 which are, in the preferred embodiment, composed of tungsten and tantalum.

Fuel rings 10 encircle the foil heat shields 11. A top view of a fuel ring is obtained in FIG. 2, and a cross-sectional view can be seen in FIG. 3. A rigidly stacked array of fuel rings 10 comprise the reactor core. The fuel rings 10 are composed of a matrix of uranium dioxide and tungsten and are clad by tungsten in the preferred embodiment, but other refractory-type reactor fuel such as uranium carbide could be used. Also, in the preferred embodiment there are 18 stacked fuel rings 10 making the core height 91.5 centimeters; and the specific matrix composition is $UO_2$-0.2W. All the fissionable material for the reactor is contained in fuel rings 10.

Still referring to FIG. 2, converter mounting ring 14 surrounds fuel ring 10 and serves the dual purpose of cladding for the outer periphery of the fuel ring 10 and as a mounting surface for the electron emitters 5. Good contact and bonding between fuel ring 10, mounting ring 14, and emitter 5 is essential to provide a heat conduction path of low resistance. In the preferred embodiment 24 converters are mounted around a complete ring.

A plurality of emitters 5 are disposed around the periphery of ring 14 thus making the emitters on the same ring electrically parallel. Cylindrical plasma envelope 4 encloses the base of emitter 5 in a gastight seal and supports structural member 3 which is rigidly sealed by ceramic seal-insulator 1 to collector 2 thus providing a fixed spacing between collector 2 and emitter 5. For plasma diodes this spacing is in the order of 0.004 inch.

The plasma envelope 4 also provides electrical connection between structural member 3 and emitter 5. The structural member 3 is electrically insulated by ceramic seal insulator 1 from collector 2. The materials of these three parts are chosen with coefficients of expansions and operating temperatures that will keep the seal insulator 1 in compression radially between collector 2 and the structural member 3 at operating temperatures. The collector may be molybdenum filled with beryllium oxide, the seal insulator may be aluminum oxide, and the main structural member tungsten or niobium. The seal insulator material may be directly deposited on to the collector 2 or it may be shrunk on and brazed with an intermediate material such as niobium. The main structural member 3 can also be shrunk on or brazed with an intermediate material such as niobium. The collector 2 or main structural member 3 might be provided with circumferential grooves into which the seal insulator 1 fits for mechanical interlocking.

The plasma envelope 4 defines a gastight chamber to contain a plasma of positive ions. A plasma reservoir 6 is connected to the chamber through passageway 13. Cesium has suitable vaporization and ionization characteristics to provide such a plasma.

Figure 1:
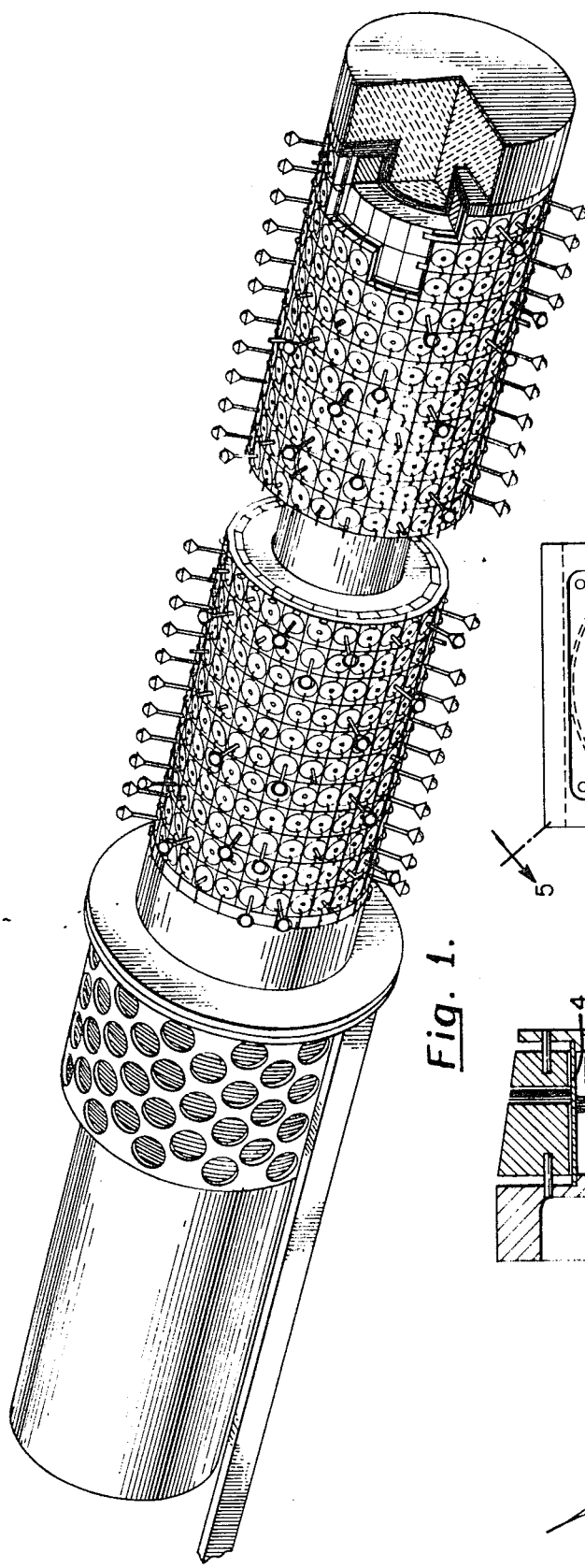
FIG. 1 is a schematic representation of the assembled reactor of thermionic converter cells with a central island reflector.
Figure 4:
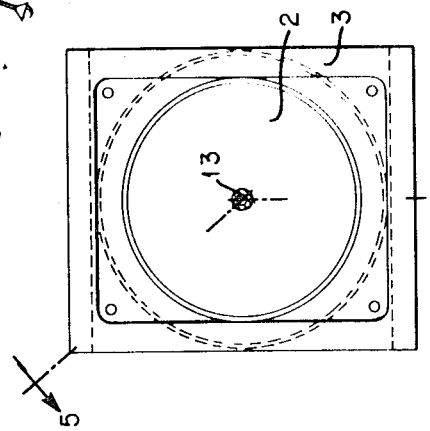
FIG. 4 is a top view of one thermionic converter diode.
Figure 5:
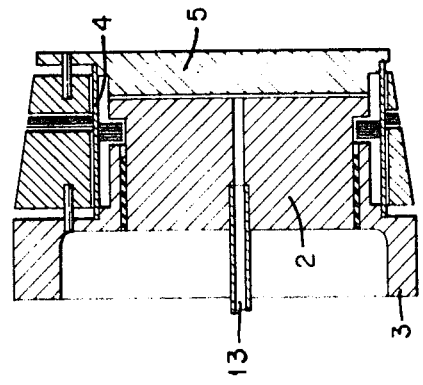
FIG. 5 is a view along line 5—5 of FIG. 4.
Figure 3:
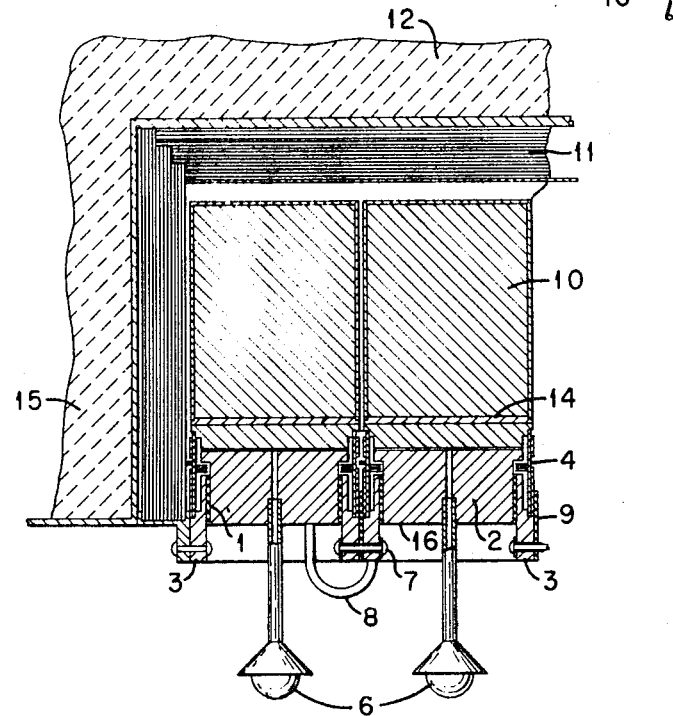
FIG. 3 is a cross-sectional view of two fuel rings and thermionic diodes adjacent to the end reflector showing the electric connection between rings.

FIG. 4 is a top view of a thermionic diode showing the shape of structural member 3. FIG. 3 shows rivets 7 rigidly fastening adjacent structural members 3 together to form a load-bearing member running along the length of the reactor. Electrical insulation 9 serves as a ring spacer and prevents electrical contact between adjacent structural members. Rivets 7 are also insulated from the structural members 3. Loads are carried from ring to ring through the main structural members 3. The only loads seen by the seal-insulators 1 are those imposed by the collector 2 and the cesium reservoir 6. The loads from each fuel ring 10 are transmitted through the plasma envelope 4 to the structural member 3 assembled to that particular fuel ring 10. This configuration results in a structure that allows for thermal expansion; that is, as the fuel ring 10 grows from thermal expansion, each row of converters along the length of the reactor is allowed to separate. Also this characteristic contributes to the negative temperature coefficient of the system.

Thermionic converters are intrinsically low-voltage, high-current devices. Therefore, for useful voltages to be obtained, a number of converters must be connected in series. Referring again to FIG. 3 it is seen that electrical series connector 8 connects the collector of one ring to the emitter of the adjacent ring thus providing the requisite cell series.

The collectors 2 are to be filled with a moderating and reflecting material, as mentioned above, such as beryllium. When so filled a radial neutron reflector is provided for the reactor core. End reflectors 15 may be provided at either or both ends of the core as shown in FIG. 3. Reactor control may be provided by a movable end reflector as in our copending application referred to above, or a central poison rod which extends through one or both end reflectors may be used.

The reactor is cooled by heat radiation. The outer surface 16 of the collectors 2 serves as a radiator surface to radiantly reject heat energy.

A summary of the characteristics of the preferred embodiment is given below along with an alternate core using uranium carbide as fuel:

|  | $UO_2$—0.2W | UC |
|---|---|---|
| Dimensions, (cm.) |  |  |
| Reactor Diameter | 43.8 | 18.3 |
| Core length | 91.5 | 91.5 |
| Weight, Pounds |  |  |
| Reactor | 2,800 | 1,150 |
| Uranium | 880 | 480 |
| Temperatures °K. |  |  |
| Island (max) | 1,250 | 1,250 |
| Core (max) | 2,500 | 2,500 |
| Emitter | 1,900 | 2,100 |
| Collector | 1,510 | 1,765 |
| Radiator | 1,420 | 1,620 |
| Power Output, Kwe | 21 | 17 |

FIG. 6 is a top view of a first alternate embodiment of the subject invention, and FIG. 7 is a view along line 7—7 of FIG. 6. Referring to FIG. 7, emitter 108 is attached to the mounting ring and the mounting ring to the fuel ring as described for the preferred embodiment above.

The plasma envelope 110 encircles and encloses emitter 108 and supports structural member 104. Structural member 104 is rectangular in shape with walls about its periphery and has an interior ledge and screw holes adapted to receive collector adapter ring 106. Collector adapter ring 106 is rigidly attached to the upper periphery of collector 103 and is firmly held in place by screws 105. Electrical insulation 107 insulates the collector 103 from the structural member 104. The internal seal insulator has three ceramic seal rings 101 with two metallic fins 102 sandwiched between and bonded to the seal rings 101. One metallic fin 102 is welded to the collector 103. The other metallic fin 102 is welded to the main structural member 104. This provides a seal and electrical insulator between the collector 103 and the main structural member 104. Plasma supply tube 111 supplies plasma to the gastight chamber defined by plasma envelope 110. Electrical series connector 112 connects the collector of one ring to the adjacent emitter of an adjacent ring to provide an electrical series for higher voltage. Structural members 104 are riveted to adjacent converter rings as in the preferred embodiment to create a complete reactor structure.

A second alternate embodiment is shown in FIGS. 8 and 9. An external seal-insulator is here used. The three ceramic seal rings 201 with metallic fins 202 sandwiched between and bonded to the seal rings 201. One metallic fin 202 is welded to the collector 203. The other fin 202 is welded to the main structural member 204. This provides a seal and electrical insulator between the collector 203 and the main structural member 204. The collector 203 is mechanically supported by the main structural member 204 by means of screws 205. Electrical insulation 206 is used to separate the screws 205 and the main structural member 204 from the collector 203. The plasma envelope 208 again defines a gastight chamber for the plasma; and electrical series connector 209 connects the emitter 207 of one cell to the collector 203 of an adjacent cell. The emitter 207 is mounted on a converter ring as in the preferred embodiment.

While the invention has been described specifically with reference to particular embodiments thereof, it will be understood that numerous other embodiments are possible and that various changes and modifications may be made, all within the full and intended scope of the claims which follow.

We claim:
1. A nuclear thermionic converter cell comprising:
   a fuel ring;
   a plurality of plasma diodes juxtaposedly mounted around the periphery of said fuel ring, with their emitters in contact with said fuel ring; and,
   neutron-moderating material filling the collectors of said diodes.
2. A nuclear thermionic converter cell comprising:
   a fuel ring containing fissionable material;
   at least one electron emitter mounted on the periphery of said fuel ring, said emitter being heated when fissions occur in said fuel ring;
   a gastight supporting envelope which has one end enclosing the periphery of said emitter;
   a structural member with a central circular opening, said member being rigidly supported by said envelope;
   a tubular seal-insulator lining the central opening of said structural member;
   a hollow cylindrical collector whose upper lateral surface compressively and rigidly fits within said seal-insulator thereby maintaining the lower transverse surface of said collector in a fixed spatial relationship with the surface of said emitter;
   a neutron moderating and reflecting material filling said hollow cylindrical collector;
   a reservoir for a positive-ion plasma; and,
   a plasma supply tube to conduct plasma from said reservoir to said envelope.
3. A nuclear thermionic converter cell comprising:
   a fuel ring;
   a converter mounting ring encircling said fuel ring and snugly fitting thereabout;
   a plurality of disk-shaped electron emitters juxtaposedly mounted around the periphery of said mounting ring;
   a plurality of cylindrical electron collectors, one collector for each emitter, each of said collectors having a diameter approximately equal to that of said emitter, a central cylindrical aperture running longitudinally through said collector, a cladding of electrically conductive material, and a filling of neutron-moderating material;
   a plurality of cylindrical ceramic seal-insulators, one seal-insulator being disposed around the radial periphery of each collector;
   a plurality of rectangular, ridged, structural members, one member for each collector, and each member having a central cylindrical housing adapted for receiving said col- lector with the seal-insulator and for maintaining a rigid radial compressive contact therewith;

a plurality of cylindrical electrically conductive envelopes, one envelope for each emitter, each envelope being of approximately the same inner diameter as said emitter disk, one end of said envelope enclosing said emitter disk in a gastight fit and the other end enclosing the cylindrical housing of said structural member in a gastight fit thus supporting said collector in a fixed spatial relationship with said emitter; and, plurality of reservoirs for a positive-ion plasma, one reservoir for each emitter, which is connected by a rigid tube to said central aperture of said collector.

4. A nuclear thermionic converter cell according to claim 3 wherein the fuel ring is composed of a matrix of uranium dioxide and tungsten and is clad by tungsten.

5. A nuclear thermionic converter cell according to claim No. 4 wherein the emitter is composed of tungsten and the collector is composed of beryllium oxide clad by molybdenum.

6. A nuclear thermionic converter cell according to claim No. 5 wherein the seal-insulator is composed of aluminum oxide.

7. A nuclear reactor comprising:
an elongated central cylindrical neutron reflector;
an annular heat shield surrounding said reflector;
a plurality of a ring-shaped nuclear thermionic converter cells according to claim No. 3, said cells surrounding said heat shield and extending in a stacked array for the length of said reflector.
electrically insulated means for rigidly fastening said structural members of adjacent cells together;
electrical series connectors connecting the collectors of one cell with emitters of the adjacent cell;
end reflectors at both ends of said central reflector; and,
control means for regulating the reactivity of said reactor.

8. A nuclear reactor according to claim No. 7 wherein the nuclear thermionic converter cells are those claimed in claim No. 6.

9. A nuclear reactor according to claim No. 8 wherein the central cylindrical reflector is composed of pyrolytic graphite clad with tungsten and the heat shields are composed of tungsten and tantalum.

10. A nuclear reactor according to claim No. 9 wherein the height of a stacked array of nuclear converter cells is 91.5 centimeters.

11. A thermionic cell comprising:
a disk-shaped electron emitter having an upper section with a smaller diameter than that of the lower section;
A cylindrical electron collector having a lower cylindrical base with a diameter approximately equal to the upper sectional diameter of said disk-shaped emitter, an upper cylindrical section with a diameter less than that of said base, and a gas passageway extending along the longitudinal axis of said collectors;
a plasma envelope whose lower portion encircles and encloses the lower section of said emitter in a gastight fit;

a collector adapter ring fitting securely about a portion of the upper section of said collector;
a rectangular structural member adapted for receiving said ring but being electrically insulated therefrom, and supported by the upper portion of said envelope whereby a fixed spatial relationship is maintained between the upper section of said emitter and the base of said collector;
three ceramic seal rings encircling said collector with two metallic annular fins, each having one of its rims sandwiched and bonded therebetween, one fine having its remaining rim welded to said structural member and the other fin having its remaining rim welded to said collector;
a plasma reservoir attached by a rigid tube to said plasma passageway;
an electric series connector to provide an electric current flow path from said collector;
a converter mounting ring adapted for mounting at least one of said disk shaped emitters thereon; and,
a nuclear fuel ring enclosed by said mounting ring.

12. A nuclear thermionic cell comprising:
a disk-shaped electron emitter having an upper section with a smaller diameter than that of the lower section;
a cylindrical electron collector having a lower cylindrical base with a diameter approximately equal to the upper sectional diameter of said disk-shaped emitter, an upper cylindrical section with a diameter less than that of said base, a lip around said upper cylindrical section, a plurality of screw holes extending through said lip, and a gas passageway extending along the longitudinal axis of said collector;
a plasma envelope whose lower portion encircles and encloses the lower section of said emitter in a gastight fit;
a rectangular structural member supported by the upper portion of said envelope and having a central cylindrical aperture with a plurality of threaded sockets disposed thereabout;
a plurality of screws securely fastening the lip of said collector to said rectangular structural member whereby a fixed spatial relationship is maintained between the upper section of said emitter and the lower base of said collector;
electrical insulation for insulating said collector from said structural member;
three ceramic seal rings disposed above said collector with two annular metallic fins, each having one of its rims sandwiched and bonded therebetween, one fin having its remaining rim welded to said structural member and the other fin having its remaining rim welded to said collectors;
a plasma reservoir attached by a rigid tube to said plasma passageway;
an electric series connector to provide an electric current flowpath from said collector;
a converter mounting ring adapted for mounting at least one of said disk-shaped emitters thereon; and,
a nuclear fuel rind enclosed by said mounting ring.

* * * * *